T. M. DAVIDSON.
EXTRUDER.
APPLICATION FILED AUG. 3, 1918.
1,324,145. Patented Dec. 9, 1919.
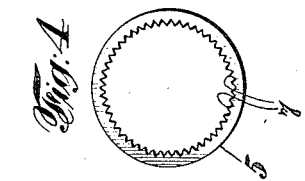
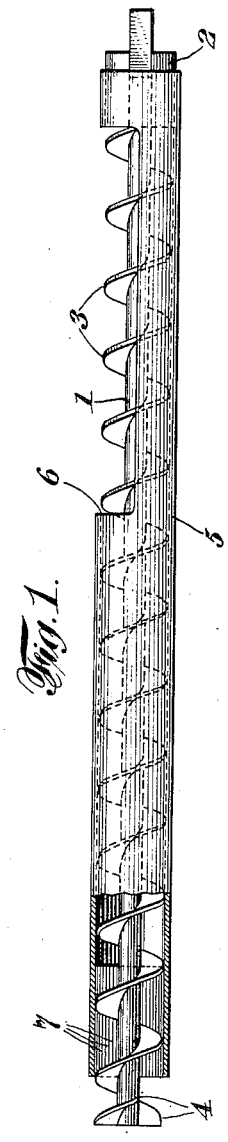
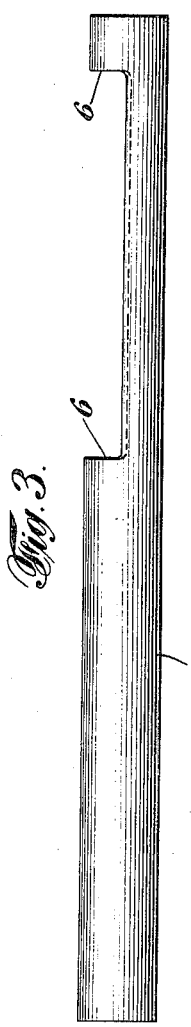
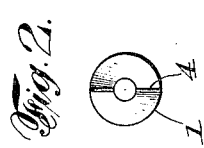
INVENTOR
Thomas Malcolm Davidson,
BY
ATTORNEY

UNITED STATES PATENT OFFICE.

THOMAS MALCOLM DAVIDSON, OF WILMINGTON, DELAWARE, ASSIGNOR TO E. I. DU PONT DE NEMOURS & COMPANY, OF WILMINGTON, DELAWARE, A CORPORATION OF DELAWARE.

EXTRUDER.

1,324,145.      Specification of Letters Patent.      Patented Dec. 9, 1919.

Application filed August 3, 1918. Serial No. 248,174.

*To all whom it may concern:*

Be it known that I, THOMAS MALCOLM DAVIDSON, of Wilmington, in the county of New Castle, and in the State of Delaware, have invented a certain new and useful Improvement in Extruders, and do hereby declare that the following is a full, clear, and exact description thereof.

My invention relates particularly to extruders, but has reference especially to extruders which are used in the filling of shells with explosives.

The object of my invention is to provide an extruder by means of which materials may be advantageously fed into containers to be filled therewith, and by means of which particularly explosives may be introduced into shells.

The object of my invention is to provide an apparatus by means of which materials may be fed in such a way so as to avoid wabbling or bending of the extruder during its operation. The object of my invention is, furthermore, to avoid the cutting of the inner wall of the feeding tube as well as leakages due to the wabbling or bending, while in addition, adding stability and uniformity to the filling operation.

In carrying out my invention, I provide an extruder screw having blades which deliver simultaneously on opposite sides at the end of the screw, thus balancing the forces at the opposite sides thereof, so as to obtain the results above referred to. Further objects of my invention will appear from the detailed description thereof contained hereinafter.

While my invention is capable of embodiment in many different forms, for the purpose of illustration I have shown only one form of apparatus made in accordance with my invention in the accompanying drawings, in which:

Figure 1 is a side elevation partly in section of an extruder screw made in accordance with my invention, Fig. 2 is an end elevation of the screw, Fig. 3 is a side elevation of a feeding tube used in connection therewith; and Fig. 4 is an end elevation of the same.

In the drawings I have shown a screw 1 having a recess end 2 for connection with any suitable source of power for rotating the screw, and being provided with a main spiral blade or single worm 3 extending throughout its length, as well as an intermediate spiral blade 4 located at the opposite end of the screw, so as to provide simultaneous deliveries on opposite sides of the screw of the material, as for example, an explosive for filling shells which might be any explosive compound requiring pressing or packing into a container such as trinitrotoluol ($C_7H_5N_3O_9$), ammonium nitrate ($NH_4NO_3$), nitro starch compounds or any other such powder. Around the screw 1 is located a feeding tube 5 having at one end a side opening 6 to receive the material to be fed, and fitting against the recess end 2 to prevent the scape of the material at this end of the screw. At the other end of the screw 1 the tube 5 does not extend quite to the extreme ends of the blades 3 and 4. It will be seen from Fig. 4 that the interior of the tube 5 is provided near the delivery end thereof with a serrated inner surface 7 to facilitate the feeding of the material by preventing the rotation thereof within the tube 5. The purpose of the tube 5 is not only by the serrated internal surface to prevent the rotation of the material within the tube, but to prevent the rotation of the material outside of the tube which has been supplied by the screw 1 to the point of delivery.

In the operation of my invention the screw 1 may be rotated from its recess end 2 by any suitable source of power, and the material to be fed by the screw, as for example, any explosive compound requiring pressing or packing into a container such as trinitrotoluol ($C_7H_5N_3O_9$), ammonium nitrate ($NH_4NO_3$), nitro starch compound or any other such powder is supplied to the screw through the opening 6, and is fed forwardly through the same while being prevented from rotating therein, owing to the serrated inner surface of the tube 5. In feeding material of the above character through the tube 5, it has been found that, if a double worm be used, the material tends to clog within the tube, which, of course, prevents proper action of the screw and also introduces an element of danger into the operation. The worm 3 is, therefore, made single for the greater portion of its length. When the material reaches the delivery end of the tube 5, the presence of the intermediate blade 4 will cause the simultaneous delivery of the material at opposite sides of the screw 1, so that the forces at opposite sides of the screw 1 are balanced. The intermediate blade 4, however, does not have the disadvantage of clogging the material within tube 5. In this way any wabbling or bending of the screw 1 and tube 5 are avoided, so that as a consequence any cutting of the tube 5 by the screw 1 or leakages are also obviated. Furthermore, for these reasons the use of extrude screws of this character will render the operation of extruding machines therewith less dangerous.

While I have described my invention above in detail, I wish it to be understood that many changes may be made therein without departing from the spirit thereof.

I claim:

1. An extruder comprising a feeding tube, a rotatable screw therewithin having a single worm adapted to feed material along said tube, and means located at the delivery end of said single worm for angularly deflecting a portion of the material fed toward the delivery point of said worm, whereby the portion of the material so deflected is delivered from a different point around the circumference of the screw, to equalize the bending strains to which the screw is subjected.

2. An extruder comprising a feeding tube, a rotatable screw therewithin having a single worm adapted to feed material along said tube, and an intermediate spiral blade interposed between the turns of said worm at its delivery end for angularly deflecting a portion of the material fed toward the delivery point of said worm, whereby the portion of the material so deflected is delivered from the opposite side of the screw, to equalize the bending strains to which the screw is subjected.

3. An extruder comprising a feeding tube, a rotatable screw therewithin having a single worm adapted to feed material along said tube, the delivery end of said worm projecting beyond said tube, and means located on the projecting end of said single worm for angularly deflecting a portion of the material fed toward the delivery point of said worm, whereby the portion of the material so deflected is delivered from a different point around the circumference of the screw, to equalize the bending strains to which the screw is subjected.

4. An extruder comprising a feeding tube, a rotatable screw therewithin having a single worm adapted to feed material along said tube, the delivery end of said worm projecting beyond said tube, and an intermediate spiral blade interposed between the turns of said worm at said projecting end for angularly deflecting a portion of the material fed toward the delivery point of said worm, whereby the portion of the material so deflected is delivered from the opposite side of the screw, to equalize the bending strains to which the screw is subjected.

In testimony that I claim the foregoing and have hereunto set my hand.

THOMAS MALCOLM DAVIDSON.

Witnesses:
JAMES SHELDON BROWNE,
EVA BAKER.